(12) United States Patent
Costes et al.

(10) Patent No.: US 8,094,059 B2
(45) Date of Patent: *Jan. 10, 2012

(54) METHOD FOR DETERMINING THE ANGULAR APERTURE CORRESPONDING TO THE EXTENT IN A PLANE OF AN OBJECT SEEN BY A RADAR ANTENNA

(75) Inventors: Clementine Costes, Brest (FR); Jean-Paul Artis, Plouzane (FR); Maxence Marcant, Milizac (FR)

(73) Assignee: Thales (FR)

( * ) Notice: Subject to any disclaimer, the term of this patent is extended or adjusted under 35 U.S.C. 154(b) by 825 days.

This patent is subject to a terminal disclaimer.

(21) Appl. No.: 12/117,846

(22) Filed: May 9, 2008

(65) Prior Publication Data
US 2011/0057832 A1    Mar. 10, 2011

(30) Foreign Application Priority Data
May 11, 2007    (FR) ..................... 07 03387

(51) Int. Cl.
*G01S 13/00*    (2006.01)
(52) U.S. Cl. .................. 342/25 C; 342/149; 342/80
(58) Field of Classification Search ............ 342/25, 342/80, 149–154
See application file for complete search history.

(56) References Cited

U.S. PATENT DOCUMENTS

| | | | |
|---|---|---|---|
| 3,070,795 A * | 12/1962 | Chambers | 342/147 |
| 5,003,313 A | 3/1991 | Doriath | |
| 6,549,161 B1 | 4/2003 | Woodell | |
| 7,714,766 B2 * | 5/2010 | Costes et al. | 342/26 R |

FOREIGN PATENT DOCUMENTS

| | | |
|---|---|---|
| FR | 2 629 921 | 10/1989 |
| FR | 2 886 772 | 12/2006 |
| FR | 2 892 829 | 5/2007 |

* cited by examiner

*Primary Examiner* — Timothy A Brainard
(74) *Attorney, Agent, or Firm* — Lowe Hauptman Ham & Berner, LLP

(57) ABSTRACT

The present invention relates to a method for determining the angular aperture corresponding to the extent in a plane of an object seen by a radar antenna, the object being situated at a given distance from the radar antenna. Echoes are measured in directions $$\theta_p - \frac{\Delta\theta}{2} \text{ and } \theta_p + \frac{\Delta\theta}{2}$$

of the plane, where $\theta_p$ is a variable angle corresponding to directions of the plane and $\Delta\theta$ is a given angular aperture. The pairwise differences are calculated between the echo measurements taken in the directions $$\theta_p - \frac{\Delta\theta}{2} \text{ and } \theta_p + \frac{\Delta\theta}{2}.$$

The slope is determined at a value $\theta_p$ of a function e of $\theta_p$ interpolated between the calculated differences, the angular aperture which corresponds to the extent of the object at the given distance being deduced from the slope. The invention has an application in meteorological radar.

10 Claims, 3 Drawing Sheets

METHOD FOR DETERMINING THE ANGULAR APERTURE CORRESPONDING TO THE EXTENT IN A PLANE OF AN OBJECT SEEN BY A RADAR ANTENNA

RELATED APPLICATIONS

The present application is based on, and claims priority from, French Application Number 07 03387, filed May 11, 2007, the disclosure of which is hereby incorporated by reference herein in its entirety.

FIELD OF THE INVENTION

The present invention relates to a method for determining the angular aperture corresponding to the extent in a plane of an object seen by a radar antenna, the object being situated at a given distance from the radar antenna. It applies for example in the field of meteorological radars for determining the height and the altitude of the summit of clouds.

BACKGROUND OF THE INVENTION

A meteorological radar makes it possible to locate precipitations such as rain, snow or hail, to measure their intensity and possibly to chart dangerous phenomena. Most meteorological radars are installed on the ground and often form part of a vaster meteorological monitoring network. But ever more airborne applications are emerging, air transport being particularly concerned by meteorological phenomena. This entails notably making it possible to sidestep cumulonimbus formations, enormous clouds that are much feared by pilots as they sometimes produce violent storms. Even airliners divert their course so as to avoid crossing the path of certain particularly threatening cumulonimbus. Specifically, lightning, hail, and strong wind shears inside the cloud add to the risk of icing and can endanger the flight if the pilot tries to pass through.

A meteorological radar allows the detection of extensive voluminal targets constituted by clouds, of which it must give the position, size and dangerousness. For this purpose, a meteorological radar may for example emit a wave in the X band. The distance to a cloud is deduced from the time necessary for the pulse emitted to perform the outward-return trip from the antenna of the radar to the cloud at the speed of light. This time corresponds simply to the duration between the emission of a pulse and the reception of its echo. Estimation of the size of a cloud involves estimating its surface area, that is to say the maximum horizontal distance over which it extends, as well as estimating its elevation, that is to say the maximum vertical distance over which it extends. Estimation of the surface area, which exploits notably the azimuthal scan of the radar beam, does not form the subject of the present invention. Estimation of the elevation, which exploits notably the elevational scan of the radar beam, forms more particularly the subject of the present invention. By way of indication, the elevation of a cumulonimbus often exceeds 10 000 metres! It is the elevation which chiefly defines the dangerousness of the cloud, since the higher a convective cloud, the more dangerous it is. But the cloud's level of dangerousness is also related to its reflectivity factor, denoted Z, which characterizes the concentration of hydrometeors in suspension in a volume of air, in liquid or solid form. In a way, the reflectivity factor Z represents the intensity of the cloud. Having passed to a logarithmic scale, it is measured in dBZ. Concretely, a display console shows the pilot a simplified representation of the clouds, with the aid of a colour code characterizing the reflectivity, whether rain, snow or hail. For example, the colour black is often used for dry air, that is to say the absence of cloud. Green and yellow can be used for medium humidity concentrations. Red is often used for zones with very strong humidity concentration, that is to say the most dangerous zones that absolutely must be sidestepped.

But constructing such a representation of a cloud is not without numerous difficulties. For example, at a given distance at which a cloud is situated, this distance being characterized by the duration between the emission of a pulse and the reception of its echo, it is difficult to estimate the size of the cloud in question. Specifically, the intensity of the echo does not make it possible to deduce the size of the cloud, since a small cloud exhibiting a high reflectivity factor can return an echo of the same intensity as a large cloud of low reflectivity. Moreover, utilizing the intensity of the echo at large distance is difficult since the echoes are weak there and mingled with the thermal noise of the radar, this being particularly troublesome.

A current solution consists in estimating pointwise, at each point of a predefined grid overlaid on the zone of interest, the intensity of the back-scattered signal. The information is derived from the radar signal relating to each of the mesh cells of the grid, and possibly adjacent mesh cells. The performance of this procedure depends first and foremost on the angular resolving power of the antenna of the radar. This is because beyond a certain distance it is no longer possible to estimate the dimensions and/or the position of a reflecting obstacle sufficiently precisely. This procedure is therefore appropriate for short-distance observations, for which the useful signal is strong and the angular resolving power of the radar high. At larger distance, the useful signal is strongly attenuated and is disturbed by the thermal noise of the radar. For certain values of the signal, it becomes impossible to determine whether the cloud lying in front of the antenna lobe is small and strongly reflective or extensive and weakly reflective, or even impossible to determine whether or not a cloud is present!

More elaborate solutions are conceivable, such as for example a solution based on estimation by minimizing an error measurement. This procedure relies on oversampling the zone to be characterized. It consists in estimating the reflectivity of a point of the grid on the basis of a series of measurements made at close points. But such a procedure would be very sensitive to thermal noise and therefore hardly effective at large distance, even though it would be desirable to allow the pilot to anticipate his sidestepping manoeuvre to the maximum. Another procedure based on deviation measurement, also known as "bi-lobing", could for its part make it possible to tackle the problem of resolution in elevation. But a technical problem related to this procedure is to do with the resolving power of the radar antenna. Typically, the angular aperture at −3 decibels about the main lobe of a meteorological radar antenna can be of the order of 3 degrees. An angular aperture of 3 degrees corresponds to an extent of nearly 4 kilometres at 40 nautical miles and to an extent of about 10 kilometres at 100 nautical miles. This does not offer acceptable precision if it is considered that the elevation of a cumulonimbus often exceeds 10 kilometres, i.e. the same order of magnitude as the aperture of the antenna lobe: the lobe encompasses almost the entire cloud, thus intrinsically prohibiting any discrimination. The implementation of the deviation measurement based procedure is therefore not without its numerous difficulties.

SUMMARY OF THE INVENTION

By proposing a global approach, which scans the cloud over the whole of its height, and by not limiting itself to the main lobe, the aim of the invention is notably to alleviate the aforesaid drawbacks. For this purpose, the subject of the invention is a method for determining the angular aperture corresponding to the extent in a plane of an object seen by a radar antenna. The object is situated at a given distance from the radar antenna. The method comprises a step of measuring echoes in directions $$\theta_p - \frac{\Delta\theta}{2} \text{ and } \theta_p + \frac{\Delta\theta}{2}$$

of the plane, where $\theta_p$ is a variable angle corresponding to directions of the plane and $\Delta\theta$ is a given angular aperture. It also comprises a step of calculating the pairwise differences between the echo measurements taken in the directions $$\theta_p - \frac{\Delta\theta}{2} \text{ and } \theta_p + \frac{\Delta\theta}{2}.$$

It also comprises a step of determining the slope at a value $\theta_p$ of a function e of $\theta_p$ interpolated between the calculated differences, the angular aperture which corresponds to the extent of the object at the given distance being deduced from the slope.

Advantageously, the slope of the function e can be determined at the value of $\theta_p$ for which the function e substantially vanishes.

For example, the angular aperture which corresponds to the extent of the object at the given distance can be extracted from a correspondence base associating angular aperture values with slope values, the slope of the function e at the value of $\theta_p$ for which the function e vanishes having been calculated beforehand on the basis of measurements performed on a synthetic object whose size is variable and therefore corresponds to a variable angular aperture. The angular aperture which corresponds to the extent of the object at the given distance can even be given by an interpolated function associating an angular aperture value with any slope value.

The plane considered can be the horizontal plane or the vertical plane.

In an embodiment, the radar can be a meteorological radar, the angular aperture corresponding to the height of a cloud. Additionally, the radar can be airborne.

Advantageously, the value of $\theta_p$ for which the function e vanishes can be assumed to point to the centre of the cloud, it being possible for the altitude of the centre of the cloud to be calculated by trigonometry using the given distance between the radar antenna and the cloud. The altitude of the summit of the cloud can then be calculated by adding half the height of the cloud to the altitude of the centre of the cloud.

The main advantages of the invention are furthermore that it is less expensive in calculation time. Notably, it does not require any matrix calculation. It makes it possible to obtain a cloud size accompanied by an estimation of its reflectivity in a more structured form than pixel-by-pixel storage, thereby considerably easing its utilization. Additionally, deviation measurement not being an approach using pointlike measurements but rather an approach using smoothed measurements leading to a global form, the invention is hardly sensitive to thermal noise. This global approach also makes it possible to obtain a cloud summit in a more accurate manner than the pointlike procedures, and it is precisely this type of information which is of interest to the pilot, much more than the reflectivity of a particular point of the cloud.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

As a first approach, the deviation measurement based procedure according to the invention makes it possible to extract the contours of a target. The principle thereof is based notably on a series of pairwise comparisons of radar signals received from two angular directions spaced apart by about an antenna lobe, for example 3 degrees in the case of an onboard meteorological radar. The procedure is particularly well suited to a radar whose antenna has an insufficiently narrow lobe with regard to the angular precision sought. In the case of a meteorological radar exhibiting an aperture of 3 degrees, the lobe encompasses almost the entirety of the clouds at large distance, thus intrinsically prohibiting any discrimination. Now, the deviation measurement based procedure being sensitive to a variation in the signal over a given zone and not to its intensity at a point, it is particularly resistant to noise of additive type such as the thermal noise of the radar.

For an arbitrary target, the procedure according to the invention makes it possible on the one hand to determine the position of the target, characterized by a centre which is itself charted by a pointing angle $\theta_{centre}$, and on the other hand makes it possible to determine the extent of the target, characterized by an angular aperture $\Delta\theta$. The pointing angle $\theta_{summit}$ corresponding to the position of the summit of the target is easily deduced from the equality (1):

$$\theta_{summit} = \theta_{centre} + \frac{\Delta\theta}{2} \qquad (1)$$

The knowledge of $\theta_{summit}$ is particularly relevant in the case of a meteorological radar where the target is a cloud, since the altitude of the summit of the cloud and its evolution over time are characteristic of the dangerousness of the phenomenon. Moreover, the procedure according to the invention makes it possible to obtain the value $\theta_{summit}$ with high precision, even at large distance, just where with other procedures the thermal noise would generate very troublesome ambiguities. Additionally, the procedure according to the invention makes it possible to immediately identify targets charted by their position characterized by $\theta_{centre}$, their size characterized by $\Delta\theta$ and possibly their intensity. The stored data are therefore of small size in comparison to a pixel-by-pixel procedure, thereby constituting a definite advantage within the framework of onboard use.

Figure 1:
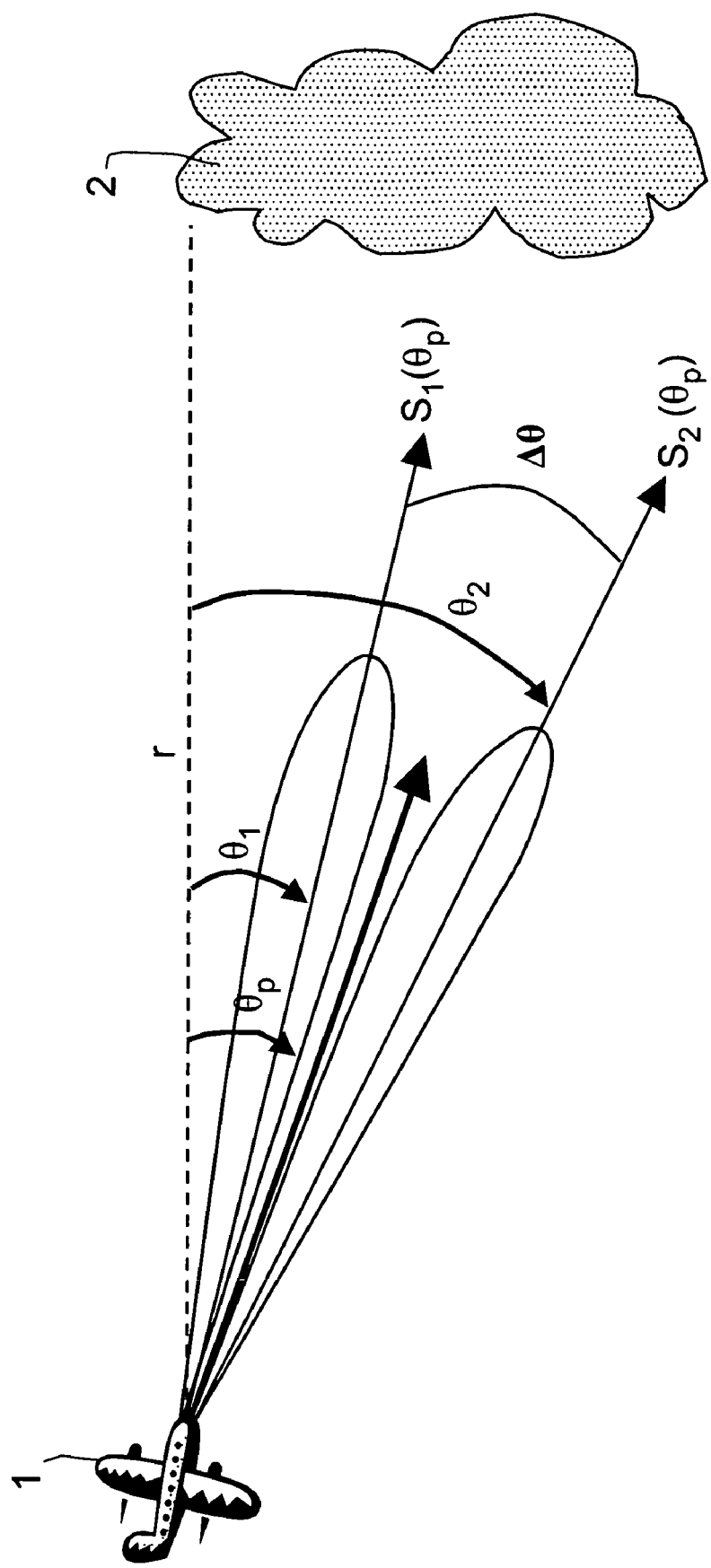
FIG. 1, an illustration by a schematic of an exemplary implementation of the procedure according to the invention in an onboard meteorological radar.

FIG. 1 illustrates by a schematic an exemplary implementation of the procedure according to the invention applied to an onboard meteorological radar on an aircraft 1. For example, for a given angle $\Delta\theta$ and for values of an elevational scan angle $\theta_p$, at least two pulses are emitted in directions $\theta_1$ and $\theta_2$ defined by $$\theta_1(\theta_p) = \theta_p - \frac{\Delta\theta}{2} \text{ and } \theta_2(\theta_p) = \theta_p + \frac{\Delta\theta}{2}.$$

For example, if the elevational range of the antenna is about 10 degrees, it can be scanned in 15 beams corresponding to 15 different values of $\theta_p$ spaced apart by about 0.7 degrees. The angle $\Delta\theta$ can be chosen in such a way that the main lobes corresponding to the two emitted beams are adjacent but do not overlap. Thus, if the antenna aperture is 3 degrees, $\Delta\theta$ can be of the order of 3 degrees. Echoes $S_1(\theta_p)$ and $S_2(\theta_p)$ originating from the two pulses reflected by a cloud 2 at a distance r from the aircraft 1 are measured. The deviation between the two echoes, that is to say the value $e(\theta_p)=S_2(\theta_p)-S_1(\theta_p)$, is calculated and stored. On completion of this process, when $\theta_p$ has scanned the whole of the elevational range of the radar, a value $e(\theta_p)$ corresponds to each of the values of $\theta_p$ that have served to measure values $S_1(\theta_p)$ and $S_2(\theta_p)$. This makes it possible to plot a so-called deviation measurement curve, that is to say to represent $e(\theta_p)$ graphically as a function of $\theta_p$ as illustrated by FIG. 2.

Figure 2:
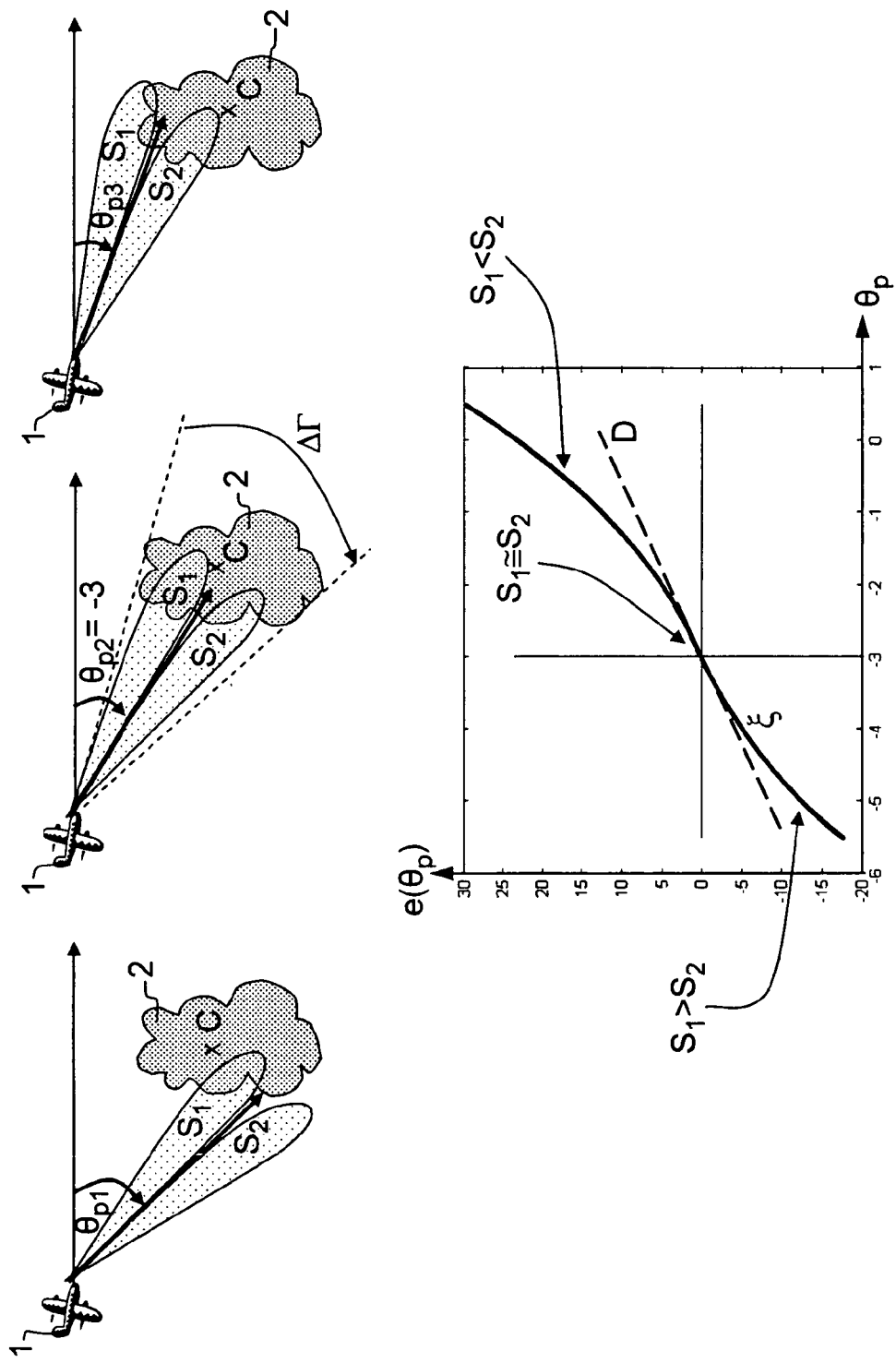
FIG. 2, an illustration by a graph of the evolution of the deviation measurement curve corresponding to the same example according to the invention as FIG. 1.

FIG. 2 illustrates in a graph a curve $\xi$ representing the evolution of the deviation measurement of the example according to the invention of FIG. 1. More generally, it also illustrates the shape of a deviation measurement curve when the deviation measurement procedure is applied to an extensive target.

The curve $\xi$ illustrates the variation in $e(\theta_p)$ for $\theta_p$ varying between −5.5 degrees and +0.5 degrees, this span corresponding to an elevational scan from bottom to top. The curve $\xi$ has been obtained by interpolation between the values of $e(\theta_p)$ calculated on the basis of actual measurements $S_1(\theta_p)$ and $S_2(\theta_p)$, numerous interpolation procedures being known moreover. The curve $\xi$ shows that the deviation measurement passes from negative values to positive values. Therefore the deviation measurement vanishes, possibly for a value of $\theta_p$ that has not served to perform an actual measurement of values $S_1(\theta_p)$ and $S_2(\theta_p)$.

From left to right at the top of FIG. 2, three schematics illustrate respectively the first case where $e(\theta_p)$ is negative which corresponds to the case where $S_1>S_2$, the second case where $e(\theta_p)$ is substantially zero which corresponds to the case where $S_1 \approx S_2$ and finally the third case where $e(\theta_p)$ is positive which corresponds to the case where $S_1<S_2$. Were it a conventional pointlike target and not the cloud 2, the conventional deviation measurement procedure would teach us only that the position of this target would be determined by the angle $\theta_p$ where the deviation measurement vanishes. But how does one interpret a deviation measurement curve when it involves a non-pointlike extensive target not having properly speaking any position?

The interpretation according to the present invention is based on the assumption that the cloud 2, observed in a vertical plane by varying the angle of elevation of the antenna, advantageously exhibits a single point C characterized by a maximum reflectivity factor, the reflectivity of the cloud 2 decreasing on moving away from the point C. Specifically, a cloud exhibits particular homogeneity properties in the vertical direction. It should be noted that this assumption would not be acceptable if the cloud 2 were observed in a horizontal plane by varying the angle of azimuth or by varying the range in terms of distance of the antenna. Specifically, a cloud does not exhibit the same homogeneity properties in the horizontal direction. But the present invention can nevertheless be applied to horizontally extensive objects, for targets other than clouds. As illustrated by FIG. 2, the present invention advantageously proposes by assumption to geometrically centre the cloud 2 on the point C. This is why the point C will subsequently be called the centre of the cloud 2.

Figure 3:
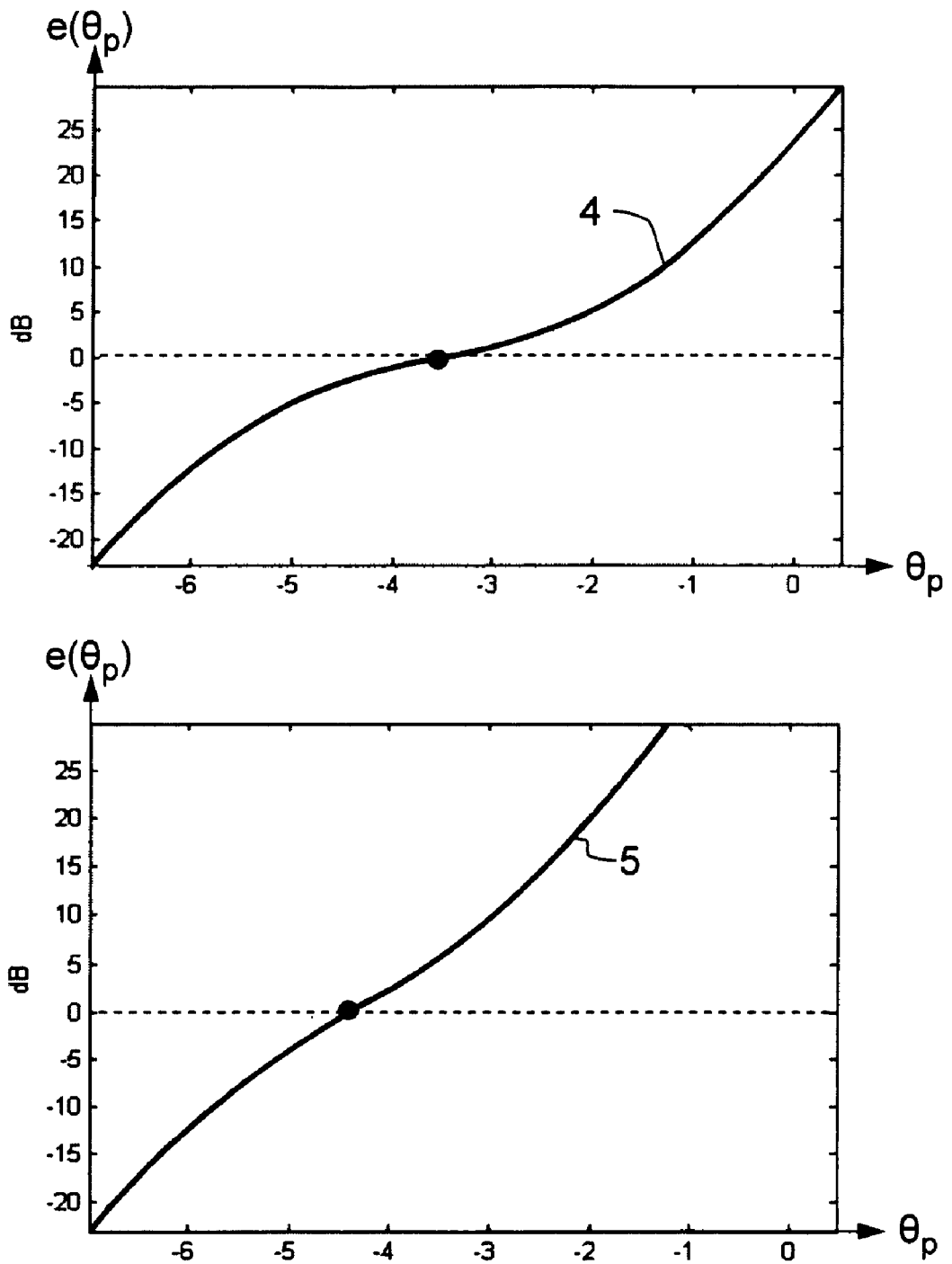
FIG. 3, an illustration by two graphs of deviation measurement curves corresponding to clouds of different sizes.

In the first case, $\theta_p=\theta_{p1}$ corresponds to an angle of elevation which intersects the cloud 2 below its centre C. Therefore, $S_1$ is reflected nearer the centre C of the cloud 2 than is $S_2$, therefore the intensity of $S_1$ is higher than that of $S_2$. In the second case, $\theta_p=\theta_{p2}$ corresponds to an angle of elevation which intersects the cloud 2 substantially at its centre C. Therefore, $S_1$ is reflected substantially as near the centre C of the cloud 2 as is $S_2$, therefore the intensity of $S_1$ is substantially identical to that of $S_2$. In the third case, $\theta_p=\theta_{p3}$ corresponds to an angle of elevation which intersects the cloud 2 above its centre C. Therefore, $S_1$ is reflected further from the centre C of the cloud 2 than is $S_2$, therefore the intensity of $S_1$ is not as high. The present invention therefore provides an entirely innovative way of utilizing the principle of the deviation measurement procedure for determining the position of the centre of a cloud. Thus, by virtue of the distance r which is known, an altitude h of the centre C is deduced in an elementary manner from the pointing angle $\theta_{p2}$ equal to −3 degrees which cancels out the deviation measurement in the example of FIG. 2. The altitude h is not represented in FIG. 2 for clarity reasons. As illustrated by FIG. 3, the present invention also proposes to use the slope of a straight line D corresponding to the slope at $\theta_{p2}$ of the deviation measurement curve, which slope will be denoted $P_2(0)$ subsequently, to estimate the size of the cloud 2.

FIG. 3 illustrates in two graphs deviation measurement curves 4 and 5 corresponding to two clouds of different sizes, curve 4 corresponding to a cloud of markedly greater size than the size of the cloud corresponding to curve 5. The difference between two pointings such as performed in the invention varies greatly with the pointing angle when a heterogeneous zone is scanned, such as for example a humid air/dry air transition; this is what occurs when a small cloud is observed, which corresponds to two successive and closely spaced transitions, dry air/humid air followed by humid air/dry air. On the other hand, when a relatively homogeneous zone is scanned, such as the interior of a large cloud, the difference between the two pointings is small and varies little. Therefore the larger the cloud, the slower the deviation measurement varies and therefore the smaller is the slope at the value for which it vanishes. Conversely, the smaller the cloud, the more rapidly the deviation measurement varies and therefore the larger is the slope at the value for which it vanishes. For example, a correspondence table containing slope values calculated on the basis of measurements taken on theoretical targets of known sizes at a known distance can be used. In such a table, to a slope value there corresponds an angular aperture. This table can even possibly form the subject of an interpolation so as to obtain a continuous correspondence function giving an angular aperture whatever the calculated slope. Thus, in the example of FIG. 2 a table or a function can match up an angular aperture $\Delta\lceil$ with the slope $P_e(0)$. It is deduced immediately that at the distance r the angular aperture $\Delta\lceil$ corresponds to a height H of the cloud 2. The height H is not represented in the figures for clarity reasons. Also, having made the assumption that C is the centre of the cloud 2, it can be deduced immediately that the floor of the cloud 2 is situated at an altitude $$h - \frac{H}{2}$$

and that its summit is situated at an altitude $$h + \frac{H}{2}.$$

Tests performed by the applicant have thus made it possible to locate the altitude of the summit of a cloudy zone of reflectivity equal to 40 dBz with a precision of the order of 500 metres at 160 nautical miles. This corresponds to an angular precision of the order of 0.1 degrees, which should not fail to be compared with the 3 degrees of antenna aperture!

The invention described above therefore makes it possible to pinpoint the summit of the clouds with remarkable precision, being in fact a procedure suited to airborne meteorological radars. Very robust to thermal noise, it is entirely indicated for numerous applications at long range. For example, it can be used for applications such as the long-distance measurement of the altitude of a reflecting cloud mass, such as the core of a cumulonimbus. The altitude being measured, it is then possible to calculate its vertical speed and to deduce therefrom its tendency.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for determining the angular aperture corresponding to the extent in a plane of an object seen by a radar antenna, the object being situated at a given distance from the radar antenna, the method comprising:

a step of measuring echoes in directions $$\theta_p - \frac{\Delta\theta}{2} \text{ and } \theta_p + \frac{\Delta\theta}{2}$$

of the plane, where $\theta_p$ is a variable angle corresponding to directions of the plane and $\Delta\theta$ is a given angular aperture;

a step of calculating the pairwise differences between the echo measurements taken in the directions $$\theta_p - \frac{\Delta\theta}{2} \text{ and } \theta_p + \frac{\Delta\theta}{2};$$

a step of determining the slope at a value $\theta_p$ of a function e of $\theta_p$ interpolated between the calculated differences, the angular aperture which corresponds to the extent of the object at the given distance being deduced from the slope.

2. The method according to claim 1, wherein the slope of the function e is determined at the value of $\theta_p$ for which the function e substantially vanishes.

3. The method according to claim 2, wherein the angular aperture which corresponds to the extent of the object at the given distance is extracted from a correspondence base associating angular aperture values with slope values, the slope of the function e at the value of $\theta_p$ for which the function e vanishes having been calculated beforehand on the basis of measurements performed on a synthetic object of variable angular aperture.

4. The method according to claim 2, wherein the angular aperture which corresponds to the extent of the object at the given distance is given by an interpolated function associating an angular aperture value with any slope value, the slope of the function e at the value of $\theta_p$ for which the function e vanishes having been calculated beforehand on the basis of measurements performed on a synthetic object of variable angular aperture.

5. The method according to claim 2, wherein the plane is the horizontal plane.

6. The method according to claim 2, wherein the plane is the vertical plane.

7. The method according to claim 6, wherein the radar is a meteorological radar, the angular aperture corresponding to the height of a cloud.

8. The method according to claim 7, wherein the value of $\theta_p$ for which the function e vanishes is assumed to point to the centre of the cloud, the altitude of the centre of the cloud being calculated by trigonometry using the given distance between the radar antenna and the cloud.

9. The method according to claim 8, wherein the altitude of the summit of the cloud is calculated by adding half the height of the cloud to the altitude of the centre of the cloud.

10. The method according to claim 9, wherein the meteorological radar is airborne.

\* \* \* \* \*